(12) United States Patent
Jeong

(10) Patent No.: US 6,348,952 B1
(45) Date of Patent: Feb. 19, 2002

(54) LEVEL ADJUST DISPLAY APPARATUS AND METHOD FOR ON-SCREEN DISPLAY MENU IN IMAGE DISPLAY DEVICE

(75) Inventor: Seok Hwa Jeong, Kumi (KR)

(73) Assignee: LG Electronics Inc. (KR)

( * ) Notice: Subject to any disclaimer, the term of this patent is extended or adjusted under 35 U.S.C. 154(b) by 0 days.

(21) Appl. No.: 09/501,188

(22) Filed: Feb. 10, 2000

(30) Foreign Application Priority Data

Mar. 30, 1999 (KR) .............................................. 99/11013

(51) Int. Cl.[7] ................................................ H04N 5/50
(52) U.S. Cl. ........................ 348/569; 348/570; 348/563; 345/342
(58) Field of Search ................................ 348/569, 570, 348/563, 564; 345/150, 431, 151; H04N 5/50, 5/445

(56) References Cited

U.S. PATENT DOCUMENTS

| 4,626,892 A | * 12/1986 | Nortrup et al. ............. 348/569 |
| 5,990,940 A | * 11/1999 | Hashimoto et al. ......... 348/569 |
| 6,034,665 A | *  3/2000 | Kim ........................... 345/150 |

FOREIGN PATENT DOCUMENTS

| EP | 0766220 A1 | 12/1995 |
| GB | 2341300 A | 1/1999 |

* cited by examiner

Primary Examiner—Reinhard J. Eisenzopf
Assistant Examiner—Trang U. Tran
(74) Attorney, Agent, or Firm—Ostrolenk Faber Gerb & Soffen

(57) ABSTRACT

A level adjust display apparatus and method for an OSD menu in an image display device in which various function control targets of the image display device are displayed on a screen in the form of various OSD menus, and the direction that the plurality of various function control targets are adjusted and the moving direction of a level meter of the OSD menus respectively corresponding to the plurality of function control targets correspond to each other, so that a user can easily control the function control targets. A level adjust display apparatus for on-screen display menu in an image display device in which function control targets are displayed on a screen as an OSD menu, including: a key input unit including a level adjust button unit for selecting a function control target and adjusting a level of the selected function control target; an OSD menu generation unit for displaying the OSD menu including level display patterns indicating the direction of the level change of the function control target; and a control unit for control in a manner that disposition direction of the level adjust button, direction of the level display patterns and the direction in which the function control targets are adjusted correspond altogether.

26 Claims, 7 Drawing Sheets

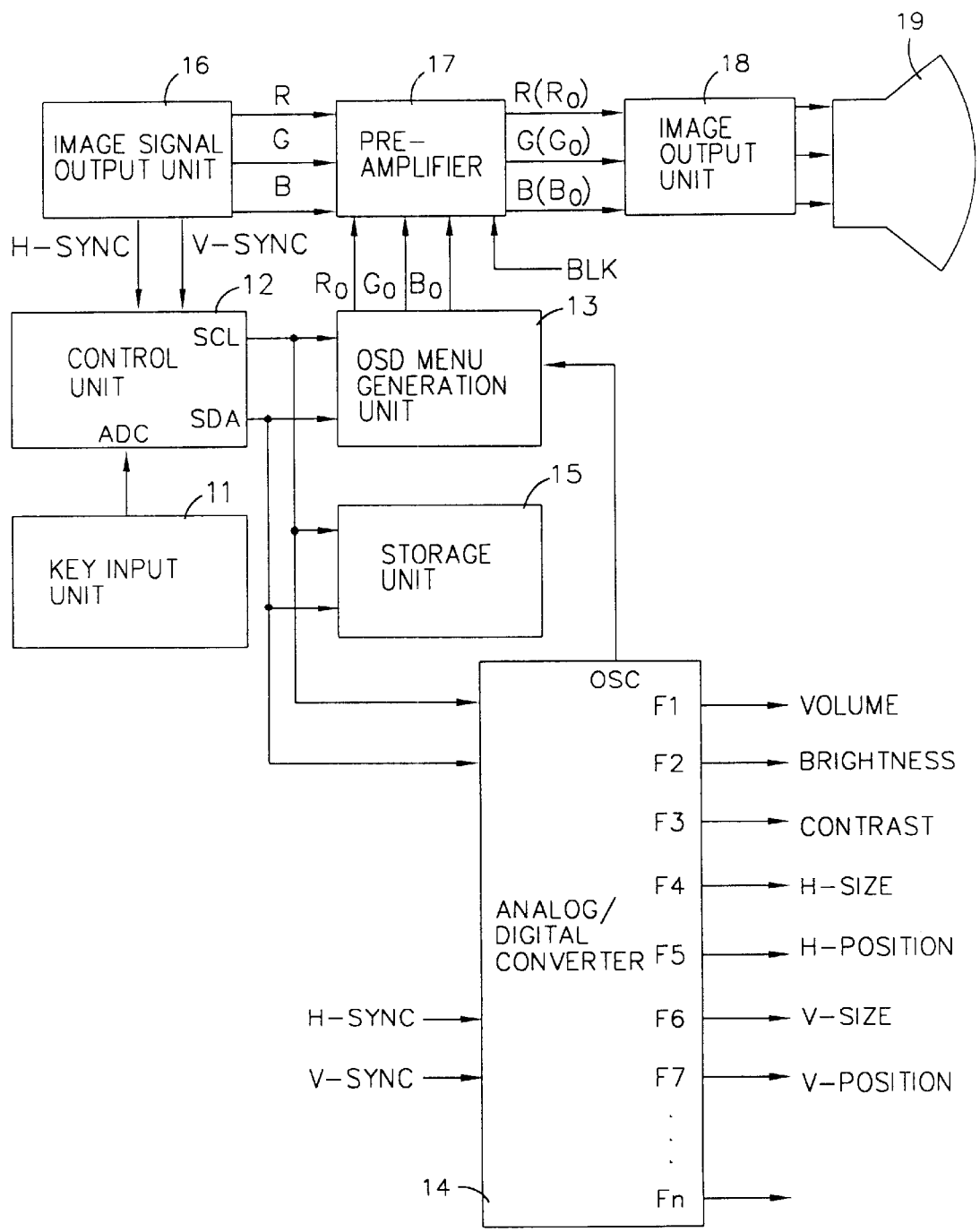

LEVEL ADJUST DISPLAY APPARATUS AND METHOD FOR ON-SCREEN DISPLAY MENU IN IMAGE DISPLAY DEVICE

BACKGROUND OF THE INVENTION

1. Field of the Invention

The present invention relates to an on-screen display (OSD) for an image display device such as TV, VCR, computer monitor, etc., and more particularly, to an improved level adjust display apparatus and method for an OSD menu in an image display device in which various function control targets of the image display device are displayed on a screen in the form of various OSD menus, and the direction that the plurality of various function control targets are adjusted and the moving direction of a level meter of the OSD menus respectively corresponding to the plurality of function control targets correspond to each other, so that a user can easily control the function control targets.

2. Description of the Background Art

In an image display device, general function control targets such as volume, brightness, contrast, horizontal size, horizontal position, vertical size, vertical position, etc., which are included in OSD menus, are displayed on a screen, whereby a user can directly select and adjust an OSD menu item from the screen while visually confirming the adjustment.

FIG. 1 is a schematic front view illustrating an OSD menu control button installation of a conventional image display device, and FIG. 2 is a partially enlarged view detailing a control panel of FIG. 1.

As shown in FIG. 1, the image display device includes a Braun tube 1, a cabinet 2 and a control panel 3 disposed on the front side of the cabinet 2.

The control panel 3 includes a level adjust button 4 for adjusting the OSD menu level on the screen, and a set/complete button 7 for setting the OSD menu and completing the menu setting.

The level adjust button 4 includes a level increase button 5 and a level decrease button 6 disposed at each side thereof, serving to increase or decrease the menu level.

Initially, when the set/complete button 7 is pressed, the OSD menu is displayed on the screen.

FIGS. 3A through 3F respectively show OSD menus with regard to function control targets according to the conventional art, wherein FIG. 3A shows an OSD menu for contrast, FIG. B shows an OSD menu for brightness, FIG. 3C shows an OSD menu for horizontal size, FIG. 3D shows an OSD menu for horizontal position, FIG. 3E shows an OSD menu for vertical size, and FIG. 3F shows an OSD menu for vertical position.

A rectangular pattern in the central OSD screen represents a level meter and its internal area represents a standard area. A thick colored portion in the standard area represents a variable histogram which horizontally fluctuates from the leftmost point thereof toward the right direction.

A plurality of fixed indication items displayed adjacent to the level meter represent OSD menus for respective function targets. A shadowed item among the indication items indicates that the OSD menu item is selected.

When a user presses the level increase button 5 or the level decrease button 6 of the level control button unit 4, the variable histogram accordingly fluctuates from the leftmost point toward the right side, whereby the user is allowed to recognize the level adjustment with regard to the selected function control target.

According to the control of the plurality of function control targets, the audio volume maximizes or minimizes, the screen contrast becomes clearer or dimmer and the screen brightness brightens or darkens.

Likewise, the volume, contrast and brightness have nothing to do with the variation of the size and the position with regard to the screen, whereby the user can sufficiently recognize the respective adjustments through the size variation of the variable histogram of the level meter with regard to the corresponding function control targets.

However, in order to adjust the function control targets such as horizontal size, horizontal position, vertical size and vertical position, the horizontally variable OSD level meter and the level increase and decrease buttons 5 and 6 horizontally disposed to control the function control targets are not suitable.

For example, in order to adjust the horizontal size, the variable histogram of the level meter moves toward one direction, that is, a horizontally single direction, thereby indicating only the horizontal fluctuation in correspondence to the variable diagram, whereas the real horizontal size of the screen image increases or decreases toward the left and right sides, that is, in both horizontal directions.

Also, under the adjustment of the horizontal position of the screen image, the screen image is directed to move either toward the left or toward the right side.

In case of the vertical size adjustment, the screen image elongates or shrinks vertically, and in case of vertical position adjustment, the screen image moves either upwardly or downwardly.

Likewise, the actual function control targets change horizontally from left to right or vertically from top to bottom, whereas the variable histogram of the level meter corresponding to the function control targets only fluctuates horizontally, so that the movement of the variable histogram of the level meter does not match with the variation direction of the real screen image.

Moreover, since the level increase button 5 and the level decrease button 6 are also horizontally disposed, although the buttons 5 and 6 correspond to the variable histogram of the level meter in disposition, the buttons 5 and 6 do not correspond to the actual moving direction of the screen image.

Therefore, when a user desires to change the screen image vertical size or position, he or she should remember which one of the two buttons 5 and 8 is for the upward adjustment or downward adjustment.

Consequently, since the level meter function according to the conventional art is not designed on the basis of human-technology, it may be difficult for the user to recognize the real variation on the screen by pressing the increase or decrease buttons 5 and 6, especially in an image display device wherein an OSD menu is not displayed on its screen. In other words, it may confuse the user, instead of offering a convenience.

SUMMARY OF THE INVENTION

The present invention is directed to overcoming the disadvantages of the conventional level adjust display apparatus and method for an OSD menu in an image display device.

Therefore, an object of the present invention is to provide a level adjust display apparatus and method for an OSD menu in an image display device in which adjusting directions of the level adjust buttons, moving directions of a level display pattern of OSD menu displayed on a screen and actual moving directions (positions) of function control targets on the screen correspond all together.

To achieve these and other advantages and in accordance with the purposed of the present invention, as embodied and broadly described herein, there is provided a level adjust display apparatus for an OSD menu in an image display device including: a key input unit having a vertical adjust button or a horizontal adjust button for selecting and controlling function control targets; an OSD menu generation unit for displaying level adjust directions of the function control targets in a vertical direction or horizontal direction; and a control unit for controlling in a manner that a disposed direction of the vertical adjust button or that of the horizontal adjust button, the level adjust display direction of the function control targets and the vertical direction (position) or the horizontal direction (position) in which the function control targets are actually adjusted on the screen are all correspond to each other.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a schematic block diagram illustrating a level control display apparatus for an OSD menu in an image display device in accordance with the present invention;

DETAILED DESCRIPTION OF THE PREFERRED EMBODIMENTS

Figure 1:
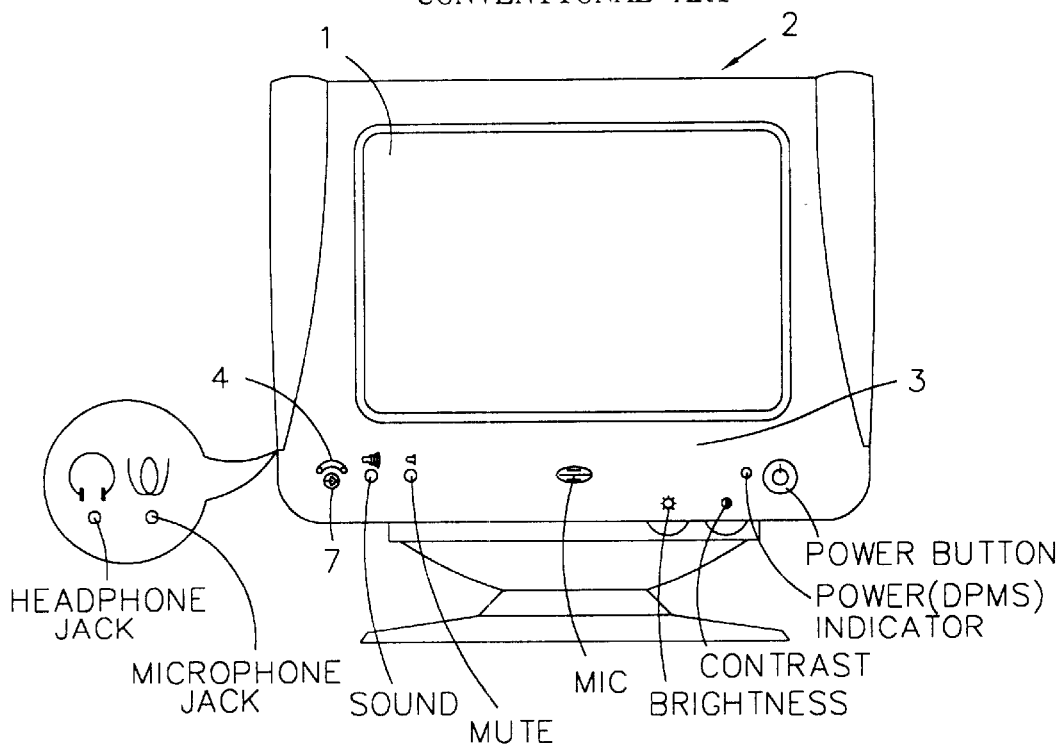
FIG. 1 is a schematic front view illustrating an installation state of OSD menu control buttons of an image display device in accordance with a conventional art.
Figure 2:
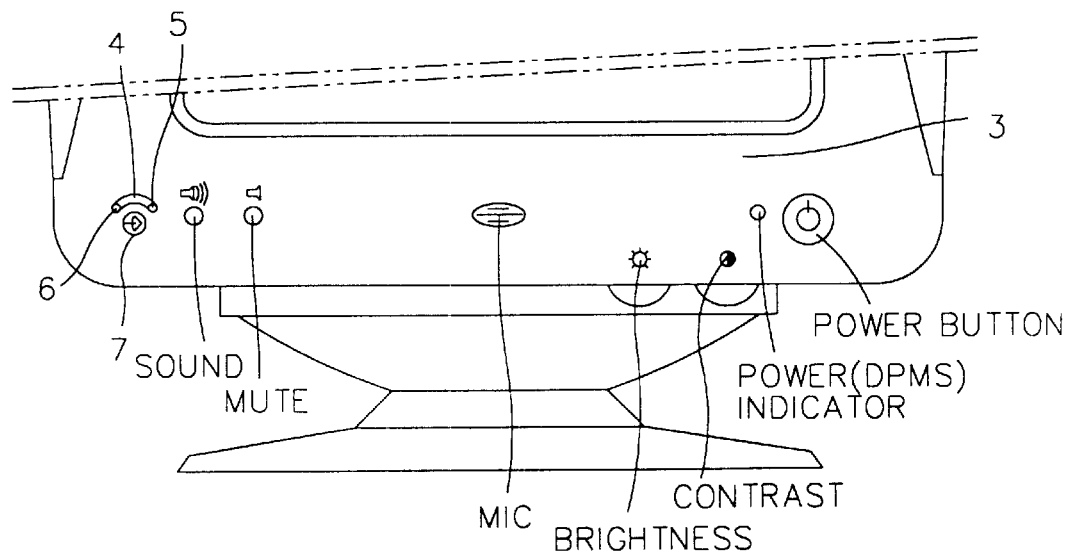
FIG. 2 is a detailed view of a control panel of FIG. 1 in accordance with the conventional art.
Figure 3A:
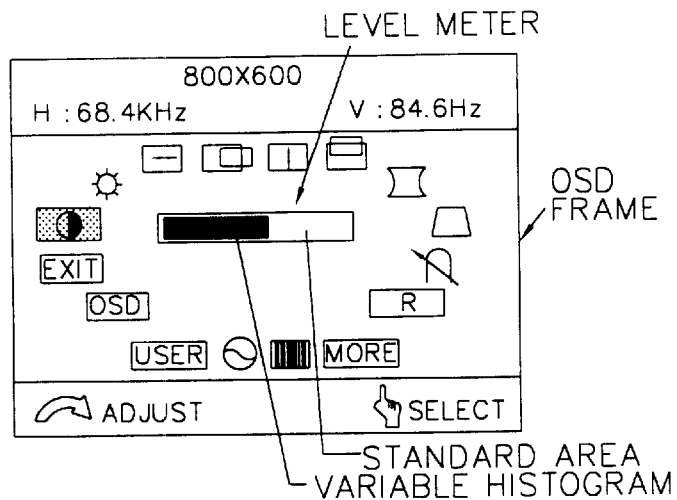
FIGS. 3A through 3F are views respectively illustrating OSD menus being displayed on a screen in correspondence to a plurality of function control targets in accordance with the conventional art.
Figure 3B:
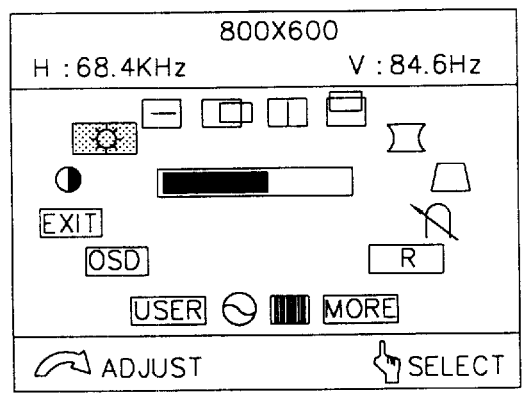
Figure 3C:
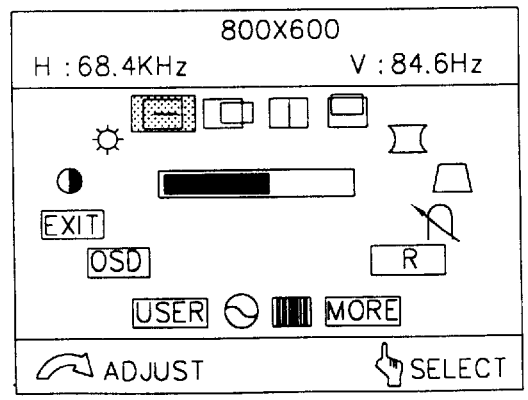
Figure 3D:
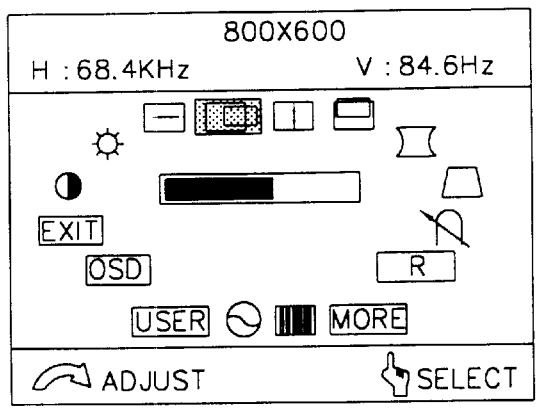
Figure 3E:
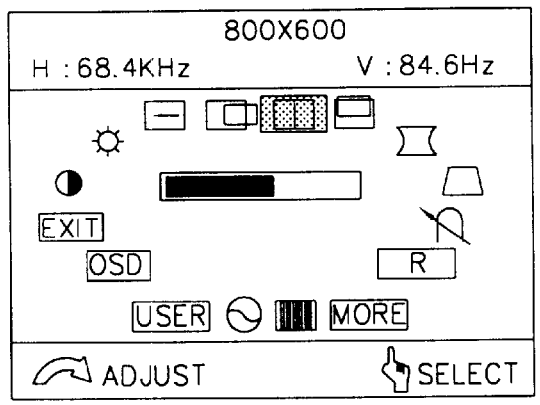
Figure 3F:
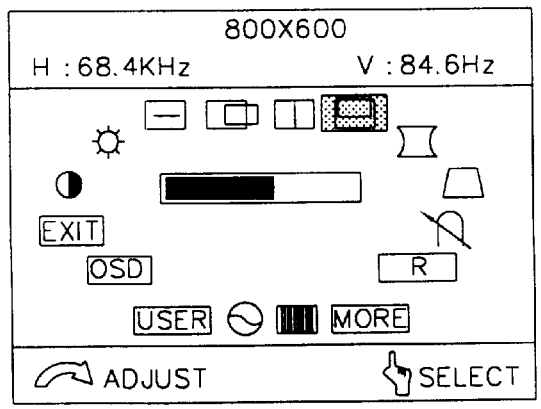

Reference will now be made in detail to the preferred embodiments of the present invention, examples of which are illustrated in the accompanying drawings.

FIG. 4 is a schematic block diagram illustrating a level control display apparatus for an OSD menu in an image display device in accordance with the present invention.

As shown in the drawing, a level control display apparatus for an OSD menu in an image display device includes an image signal output unit 16 for outputting image signals R, G and B, and a horizontal and a vertical synchronous signals H-Sync and V-Sync; a key input unit 11 for outputting a command signal for selectively controlling various function control targets of the image display device according to a user's operation; a control unit 12 for discriminating a horizontal and vertical synchronous signals H-Sync and V-Sync inputted from the image signal output unit 16; an OSD menu generation unit 13 for outputting OSD image signals Ro, Bo and Go corresponding to the function control targets upon receipt of the control signal and the control data, so as to display a selected function control target on a screen as an OSD menu; a digital/analog converter 14 for outputting analog signals corresponding to various function control targets according to the control signal and the control data; a storage unit 15 for storing the control data; a pre-amplifier 17 for converting the image signals R, G and B and the OSD image signal Ro, Go and Bo to predetermined levels according to a blanking signal BLK and outputting it; an image output unit 18 for amplifying the converted image signals R, G, B, Ro, Go and Bo; and a CRT 19 for displaying the image signals R, G, B, Ro, Go and Bo outputted from the image output unit 18.

The control unit 12 includes a general MICOM, and the storage unit 15 includes an EEPROM (electrically erasable programmable read only memory).

Figure 5:
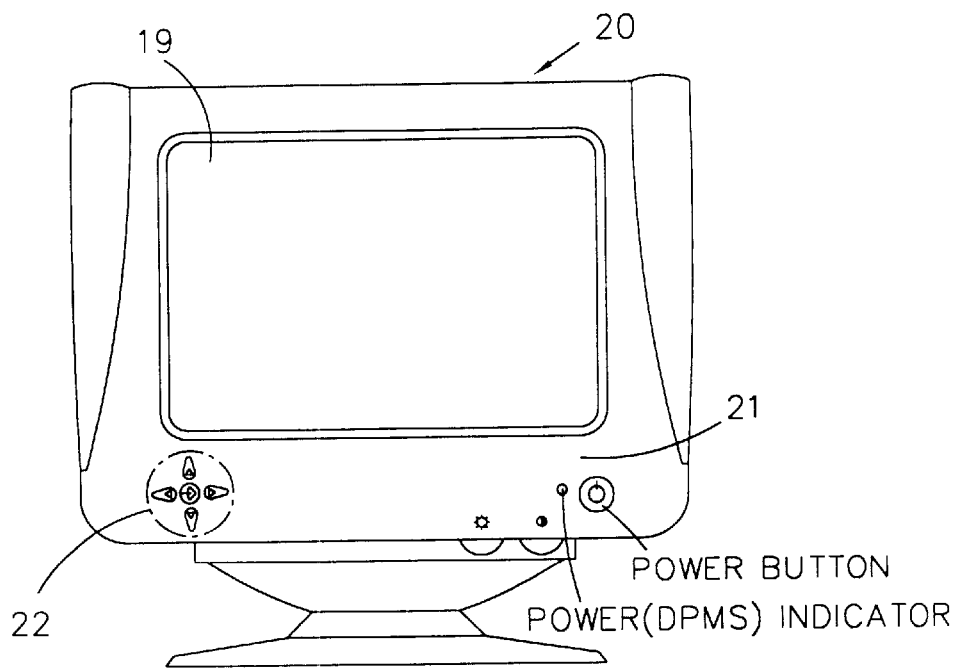
FIG. 5 is a schematic front view illustrating an installation state of OSD menu adjust buttons in the image display device in accordance with the present invention.
Figure 6:
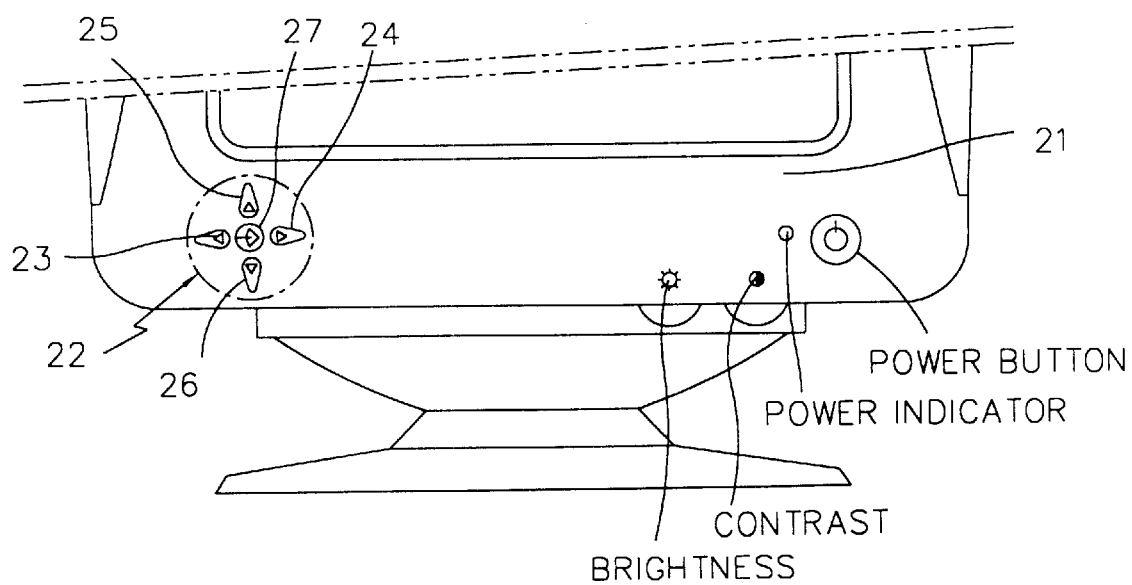
FIG. 6 is a detailed view of a control panel of FIG. 5 in accordance with the present invention.

FIG. 5 is a schematic front view illustrating an installation state of OSD menu adjust buttons in the image display device in accordance with the present invention, and FIG. 6 is a detailed view of a control panel of FIG. 5.

A cabinet 20 of FIG. 5 includes a control panel 21, and the control panel 21 includes a level adjust button unit 22 for selecting and adjusting a desired function among the various function control targets of the image display device by a user. The level adjust button unit 22 is included in the key input unit 11.

As shown in FIG. 6, the level adjust button unit 22 includes horizontal adjust buttons 23 and 24 disposed in horizontal direction for adjusting the function control targets in the horizontal direction; vertical adjust buttons 25 and 26 disposed in the vertical direction for adjusting the function control targets in the vertical direction; and a set/completion button 27 disposed at the center of the horizontal and vertical adjust buttons 23, 24, 25 and 26 for selecting and storing the function control targets.

The key input unit 11 may be implemented with a remote controller serving as the control panel unit 21 or having the function of the control panel unit 21, and in case that the image signal output unit 16 is implemented by a personal computer, the key input unit 11 may be implemented by key board in use for the personal computer.

The OSD menu generation unit 13 displays at least one of respective menu indicators of the OSD menu such as characters, numbers, diagrams and symbols on the OSD screen in an invariable pattern according to the control signal and the control data, and outputs the OSD image signals Ro, Go and Bo for representing a control state on the OSD screen in a blinking display pattern or a highlighted display pattern when the selected function control target is being controlled.

The OSD menu displayed on the screen by means of the image signals Ro, Go and Bo is designed when the OSD masking is fabricated, thereby displaying it on the screen of a CRT.

The operation of the level adjust display apparatus constructed as described above will now be explained.

The image signal output unit 16 outputs the image signals R, G and B to the pre-amplifier 17 and the horizontal and vertical synchronous signals H-Sync and V-Sync to the control unit 12. The pre-amplifier 17 converts the image signals R, G and B to a suitably predetermined level and outputs it to the image output unit 18.

The converted image signals R, G and B are amplified by the image output unit 18 and applied to the CRT 19, thereby displaying an image. This is a general process without the OSD menu displayed.

Operation of displaying the OSD menu on the screen will now be described.

When it is desired to control the function control targets, a user presses the set/completion button 27 of the level adjust button unit 22 disposed in front side of the cabinet 20.

Then, the key input unit 11 outputs a command signal of an analog having a predetermined value to the analog/digital converter of the control unit 12. The control unit 12 converts the analog command signal to a digital signal and processes it to output the control signal through a serial clock line SCL and the control data through the serial data line SDA.

The outputted control signal and the control data are inputted to the OSD menu generation unit 13 and the digital/analog converter 14.

The digital/analog converter 14 converts the horizontal and vertical synchronous signals H-Sync and V-Sync and the control signal and control data to an analog signal, outputs an analog signal corresponding to the plurality of function control targets such as a volume, a brightness, a contrast, a horizontal size H-size, a horizontal position H-Position, a vertical size V-size and a vertical position V-position through a plurality of function control output terminal F1~Fn, and adjusts an oscillation frequency according to the horizontal and vertical synchronous signals H-Sync and V-Sync so as to output it through the terminal OSC.

The OSD menu generation unit 13 receives the control signal and the control data from the control unit 12 and outputs the OSD image signals Ro, Go and Bo. The OSD image signals Ro, Go and Bo are converted to predetermined levels by the pre-amplifier 17 and amplified by the image output unit 18 so as to be displayed on the CRT 19, so that the OSD menu corresponding to the OSD image signals Ro, Go and Bo are displayed on the screen of the CRT 19.

The control unit 12 controls in a manner that the control signal and the control data are stored in the storage unit 15, so that the control state of the OSD menu in previous use is continuously maintained, and the control signal and the control data are used when the corresponding OSD menu is re-adjusted later.

Figure 7A:
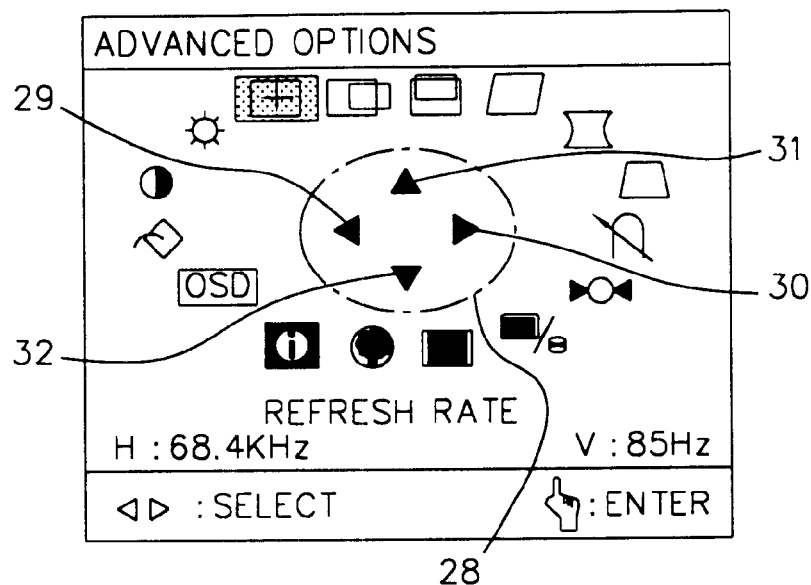
FIGS. 7A thorough 7D are views respectively illustrating OSD menus being displayed on the screen in correspondence to a plurality of function control targets in accordance with the present invention.

FIGS. 7A thorough 7D are views respectively illustrating OSD menus being displayed on the screen in correspondence to a plurality of function control targets in accordance with the present invention.

FIG. 7A shows the OSD menu displayed on the screen for adjusting a horizontal and a vertical sizes. As shown in the drawing, a level display pattern unit 28 is positioned at the center of the screen, having triangle-shaped horizontal and vertical level display patterns 29~32 each of which displays level adjust states of the function control targets.

According to the level adjust state, each of the horizontal and vertical level display patterns 29~32 is highlighted or blinks. The triangle-shaped arrows face each other or face away each other. That is, the triangle-shaped arrows are directed outside from the center therebetween or directed to the center therebetween from outside.

The horizontal level display patterns 29 and 30 display variations of the horizontal direction of the function control targets or variations of degree of the function control targets, while the vertical level display patterns 31 and 32 display variations of the vertical direction of the function control targets.

Display indicators around the level display pattern unit 28 represent function control targets, in which at least one of characters, abstract characters, numbers, figures or signs are shown in a fixed form.

Among the fixed display indicators, a display indicator corresponding to a function control target selected by the user is displayed by one of a different color, brightness, pattern, translucent shadow, so as to clearly distinguish from each other.

The fixed display indicator and the level display patterns 29~32 may be displayed in the same color to each other, or in a different color for the sake of clear distinction to each other. The color, the brightness or the pattern of the level display patterns 29~32 can be adjusted suitably in consideration of the user's aesthetic sense.

When the OSD menu is displayed on the screen, the user selects the set/completion button 27 for a desired function control target among the plurality of function control targets while viewing the OSD menu as displayed and operates one of the horizontal adjust buttons 23 and 24 or the vertical adjust buttons 25 and 26 to control the selected function control target.

According to such operation, the key input unit 11 outputs a command signal having a predetermined value to the control unit 12, and according to the control signal and the control data outputted from the control unit 12, the digital/analog converter 14 changes a level of one of the function control targets and outputs it through a corresponding one out of the plurality of function control output terminals.

The OSD menu generation unit 13 outputs the OSD image signals Ro, Go and Bo according to the control signal and the control data. The OSD image signals Ro, Go and Bo are processed by the pre-amplifier 17 and the image output unit 18 to be displayed on the CRT 19, so that the horizontal level display patterns 29 and 30 or the vertical level display patterns 31 and 32 corresponding to the selected function control target is selected.

At this time, the selected level display pattern is highlighted or blinks for predetermined time intervals while the user is pressing the horizontal or vertical control buttons 23~26 of the level adjust button unit 22. And, the direction of the horizontal and vertical level display pattern 29~32 corresponds to the direction in which the function control target is varied.

Accordingly, when the user operates the horizontal or the vertical adjust buttons 23~26, he or she can notice the function control target being actually adjusted on the screen and the horizontal or the vertical level display patterns 29~32 being highlighted or blinking as well as noticing the direction of the horizontal and the vertical level display patterns 29~32, so that the user can adjust the function control target accurately as desired while seeing the adjustment degree and/or the adjustment direction of the function control target.

In that manner, the user can adjust the levels of the OSD menus, and when the adjustment is judged to be completed, he or she presses the se/completion button 27, and then the control unit 12 stores the control data for the function control target of which the level adjustment is completed.

Process for adjusting the horizontal size, the vertical size, the horizontal position, the vertical position and the level will now be described.

First, the process for adjusting the horizontal size and the vertical size will now be described with reference to FIG. 7A.

In a state that the OSD menu is displayed on the screen of the CRT 17, the user operates the horizontal adjust buttons 23 and 24 to thereby select a function control target corresponding to the horizontal and the vertical size.

After ascertaining the darkened rectangular box (in translucent state) among the plurality of function control targets, the user presses the set/completion button 27 to select a function control target corresponding to the horizontal and the vertical size.

Thereafter, when the user presses the horizontal adjust buttons 23 and 24, the horizontal size of the screen is adjusted, during which the horizontal level display patterns 29 and 30 are highlighted or blinking.

In case of increasing the horizontal size, the triangle-shaped arrows, that is the horizontal level display patterns 29 and 30, are facing away each other, while in case of decreasing the horizontal size of the screen (though not shown in FIG. 7A), the triangle-shaped arrows, the horizontal level display patterns 29 and 30, are facing each other.

Meanwhile, when the user presses the vertical adjust buttons 25 and 26, the vertical size of the screen is adjusted, during which the vertical level display patterns 31 and 32 are highlighted or blinking.

In case of increasing the vertical size, the triangle-shaped arrows, that is the vertical level display patterns 31 and 32, are facing away each other, while in case of decreasing the vertical size of the screen (though not shown in FIG. 7A), the triangle-shaped arrows, the vertical level display patterns 31 and 32, are facing each other.

In that manner, the horizontal size or the vertical size of the screen is adjusted according to the operation of the user, and while the horizontal level display patterns 29 and 30 or the vertical level display patterns 31 and 32 are highlighted or blinking, the direction of the horizontal level display patterns 29 and 30 or the vertical level display pattern 31 and 32 is changed, so that the user easily recognizes how the desired function control targets are adjusted.

Figure 7B:
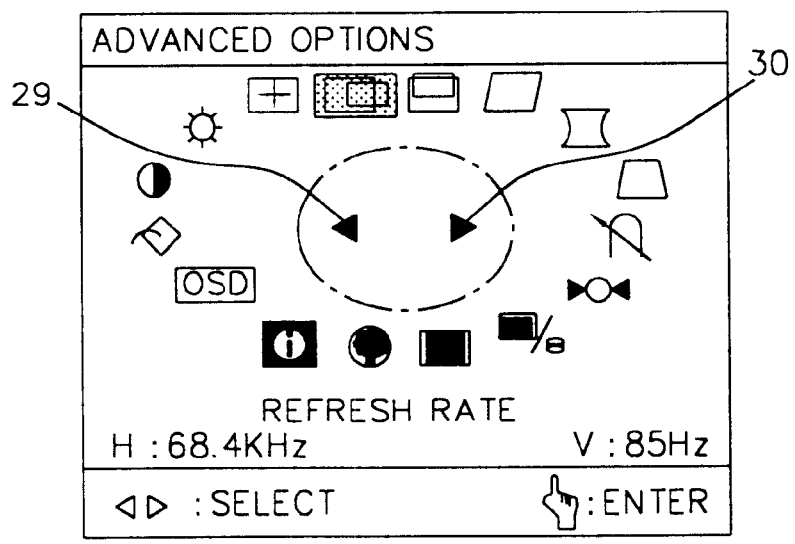

The process for adjusting the horizontal position will now be described with reference to FIG. 7B showing the OSD menu displayed for adjusting the horizontal position, where the horizontal level display patterns 29 an 30 are displayed and the vertical level display patters 31 and 32 are not displayed.

In a state that the OSD menu is displayed on the screen of the CRT 17, the user operates the horizontal adjust buttons 23 and 24 to select a function control target corresponding to the horizontal position.

Thereafter, when the user presses the horizontal adjust buttons 23 and 24, the horizontal position of the screen moves leftward or rightward, during which the horizontal level display patterns 29 and 30 are highlighted or blinking.

In case that the horizontal position of the screen moves leftward, the horizontal level display pattern 29 is highlighted or blinking, while in case that the horizontal position of the screen moves rightward, the horizontal level display pattern 30 is highlighted or blinking.

Figure 7C:
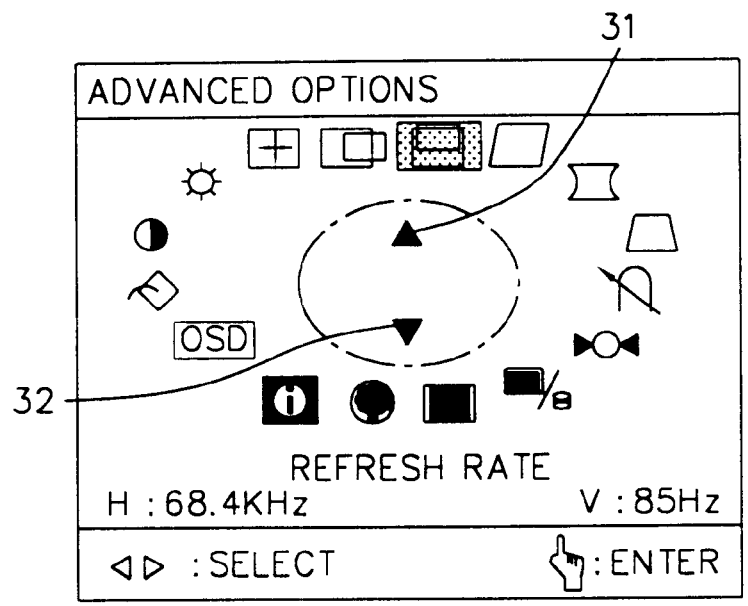

The process for adjusting the vertical position will now be described with reference to FIG. 7C showing the OSD menu displayed for adjusting vertical position, where vertical level display patterns 31 and 32 are displayed and the horizontal level display patterns 29 and 30 are not displayed.

In a state that the OSD menu is displayed on the screen of the CRT 17, the user operates the vertical adjust buttons 25 and 26 to select a function control target corresponding to the horizontal position.

Thereafter, when the user presses the vertical adjust buttons 25 and 26, the vertical position of the screen moves upward or downward, during which the vertical level display patterns 31 and 32 are highlighted or blinking.

In case that the vertical position of the screen moves upward, the vertical level display pattern 31 is highlighted or blinking, while in case that the vertical position of the screen moves downward, the vertical level display pattern 32 is highlighted or blinking.

Figure 7D:
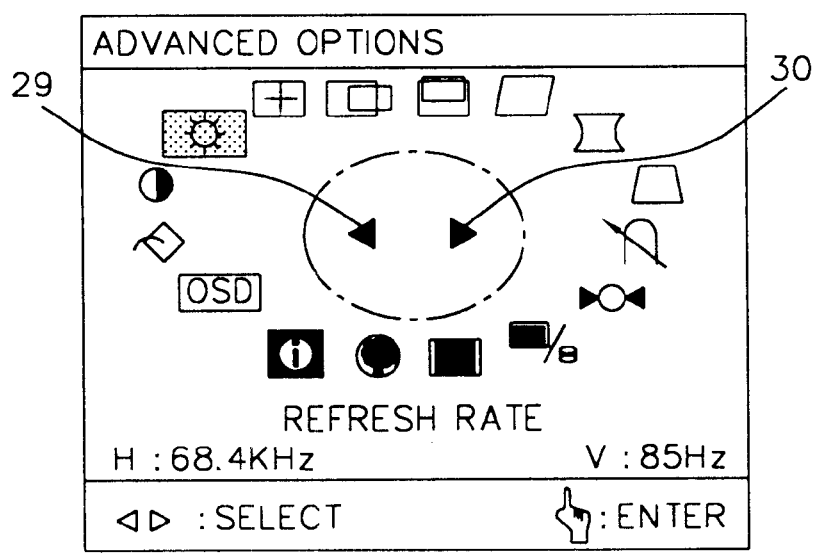

The process for adjusting the level of the function control targets such as the brightness and the contrast among the plurality of the function control targets with reference to FIG. 7D showing the OSD menu displayed for adjusting the level of the brightness, where the horizontal level display patterns 29 and 30 are displayed and the vertical level display patterns 31 and 32 are not displayed.

In a state that the OSD menu is displayed on the screen of the CRT 17, the user operates the vertical adjust buttons 25 and 26 to select a function control target corresponding to brightness.

Thereafter, when the user presses the horizontal adjust buttons 23 and 24, the screen is brightened or darkened, during which the horizontal level display patterns 29 and 30 are highlighted or blinking.

In case that the screen is darkened, the horizontal level display pattern 29 is highlighted or blinking, while in case that the screen is brightened, the horizontal level display pattern 30 is highlighted or blinking.

In that manner, in case that the level of the screen is adjusted, the horizontal level display pattern 30 is highlighted or blinking when the level is increased, while the horizontal level display pattern 29 is highlighted or blinking when the level is decreased.

As so far described, in the level adjust display apparatus for on-screen display menu in the image display device according to the present invention, operation direction in which the plurality of level adjust buttons, the direction in which the level display patterns are displayed, and the direction in which the actual screen is varied correspond altogether, so that the user can adjust the level of the function control targets easily and conveniently while seeing the OSD menu in view of human-technology.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A level adjust display apparatus for on-screen display menu in an image display device in which function control targets are displayed on a screen as an OSD menu, comprising:

a key input unit including a level adjust button unit for selecting a function control target and adjusting a level of the selected function control target;

an OSD menu generation unit for displaying the OSD menu including level display patterns indicating the direction of the level change of the function control target; and a control unit for control in a manner that disposition direction of the level adjust button, direction of the level display patterns and the direction in which the function control targets are adjusted correspond altogether.

2. The apparatus according to claim 1, wherein the level adjust button unit includes a horizontal adjust button for adjusting the function control targets in a horizontal direction and a vertical adjust button for adjusting the function control targets in a vertical direction.

3. The apparatus according to claim 1, wherein the level display pattern includes a horizontal level display pattern for displaying variation of the function control target in the horizontal direction, and a vertical level display pattern for displaying variation of the function control targets in the vertical direction.

4. The apparatus according to claim 1, wherein while a function control target is being adjusted, the corresponding level display pattern is highlighted or blinking.

5. The apparatus according to claim 1, wherein the level display patterns face away to each other in case that the level of the function control target is increased, while the level display patterns face to each other in case that the level of the function control target is decreased.

6. The apparatus according to claim 1, wherein the level display patterns are positioned at the center of the screen of the OSD menu, around which at least one of characters, abstract characters, numbers, figures and signs is displayed as a fixed display indicator.

7. The apparatus according to claim 6, wherein the fixed display indicator and the level display pattern are displayed in the same color to each other, or displayed in different colors to each other.

8. The apparatus according to claim 6, wherein a display indicator, among the fixed display indicators, corresponding a function control target selected by a user is displayed by one of color, brightness, pattern and translucent shadow that is different from other display indicators.

9. The apparatus according to claim 8, wherein the color, brightness, pattern, translucent shadow of the level display pattern is adjustable.

10. The apparatus according to claim 1, wherein the key input unit includes a control panel, a remote controller or a key board for personal computer.

11. A method for displaying an OSD menu on a screen in an image display device, comprising:
receiving a command signal for controlling a function control target as a level adjust button is operated to adjust a selected function control target;
discriminating the command signal and outputting a control signal and a control data according to the discrimination result; and
displaying an OSD menu including a level display pattern that displays a level variation direction of the function control target according to the control signal and the control data, on a screen,
wherein disposition direction of the level adjust button, direction of the level display patterns and the direction in which the function control targets are adjusted correspond altogether.

12. The method according to claim 11, wherein the level display pattern includes a horizontal level display pattern for displaying variation of the function control target in the horizontal direction, and a vertical level display pattern for displaying variation of the function control targets in the vertical direction.

13. The method according to claim 11, wherein while a function control target is being adjusted, the corresponding level display pattern is highlighted or blinking.

14. The method according to claim 11, wherein the level display patterns face away to each other in case that the level of the function control target is increased, while the level display patterns face to each other in case that the level of the function control target is decreased.

15. The method according to claim 11, wherein the level display patterns are positioned at the center of the screen of the OSD menu, around which at least one of characters, abstract characters, numbers, figures and signs is displayed as a fixed display indicator.

16. The method according to claim 15, wherein the fixed display indicator and the level display pattern are displayed in the same color to each other, or displayed in different colors to each other.

17. The method according to claim 15, wherein a display indicator, among the fixed display indicators, corresponding a function control target selected by a user is displayed by one of color, brightness, pattern and translucent shadow that is different from other display indicators.

18. The method according to claim 17, wherein the color, brightness, pattern, translucent shadow of the level display pattern is adjustable.

19. A method for displaying an OSD menu on a screen in an image display device, comprising:
displaying an OSD menu including level display patterns on a screen when a set/completion button of a level adjust button unit is pressed;
selecting a function control target by pressing the level adjust button;
adjusting the selected function control target by pressing the level adjusting button; and
corresponding all of a disposition direction of the level adjust button, direction of the level display patterns and the direction in which the function control targets are adjusted.

20. The method according to claim 19, wherein the level display pattern includes a horizontal level display pattern for displaying variation of the function control target in the horizontal direction, and a vertical level display pattern for displaying variation of the function control targets in the vertical direction.

21. The method according to claim 19, wherein while a function control target is being adjusted, the corresponding level display pattern is highlighted or blinking.

22. The method according to claim 19, wherein the level display patterns face away to each other in case that the level of the function control target is increased, while the level display patterns face to each other in case that the level of the function control target is decreased.

23. The method according to claim 19, wherein the level display patterns are positioned at the center of the screen of the OSD menu, around which at least one of characters, abstract characters, numbers, figures and signs is displayed as a fixed display indicator.

24. The method according to claim 23, wherein the fixed display indicator and the level display pattern are displayed in the same color to each other, or displayed in different colors to each other.

25. The method according to claim 23, wherein a display indicator, among the fixed display indicators, corresponding a function control target selected by a user is displayed by one of color, brightness, pattern and translucent shadow that is different from other display indicators.

26. The method according to claim 25, wherein the color, brightness, pattern, translucent shadow of the level display pattern is adjustable.

* * * * *